Fig. 7

Sept. 28, 1965   W. F. LEINEWEBER, JR., ETAL   3,208,106
BALE OPENING AND BLENDING APPARATUS Filed Aug. 9, 1962   10 Sheets-Sheet 7

INVENTORS
WILLIAM F. LEINEWEBER JR.
JOHN C. WHITEHURST,
HANS J. KLAEUI
BY
WATTS & FISHER
ATTORNEYS

INVENTORS
WILLIAM F. LEINEWEBER JR.,
JOHN C. WHITEHURST,
& HANS J. KLAEUI
BY WATTS & FISHER

ATTORNEYS

Fig. 16

Sept. 28, 1965   W. F. LEINEWEBER, JR., ETAL   3,208,106
BALE OPENING AND BLENDING APPARATUS
Filed Aug. 9, 1962
10 Sheets-Sheet 10

INVENTORS
WILLIAM F. LEINEWEBER JR,
JOHN C. WHITEHURST,
& HANS J. KLAEUI
BY
WATTS & FISHER
ATTORNEYS

United States Patent Office 3,208,106
Patented Sept. 28, 1965

3,208,106
BALE OPENING AND BLENDING APPARATUS
William F. Leineweber, Jr., John C. Whitehurst, and Hans
J. Klaeui, all of Greenville, S.C., assignors to Crompton
& Knowles Corporation
Filed Aug. 9, 1962, Ser. No. 215,952
24 Claims. (Cl. 19—80)

This invention relates generally to the textile industry and is particularly concerned with the opening of bales of fiber and blending of such fibers from a plurality of bales.

During the past 15 to 20 years, much progress has been made in the manufacturing processes of producing yarns and fabrics, resulting in improved quality. When synthetic fibers were first introduced, it was found that fabrics could be produced which had new properties and characteristics if several of these synthetic fibers were blended together in making the yarns and fabrics. However, since the synthetic fibers reacted differently to various types of dyes used in treating fabrics, it became necessary to devise means by which the various fibers could be accurately proportioned in predetermined amounts and percentages to prevent streaks of different shades appearing in the cloth when dying with different dyes.

Further, it has long been known that many types of fibers very widely in their individual characteristics. For example, the characteristics of cotton fibers, including diameter, length and percentages of long, intermediate and short fibers, may vary depending on the localities and conditions under which the cotton is grown. Since the yarn and cloth necessarily will vary with the variations of fibers contained in it, efforts have been made to obtain the mixtures and blends of fibers which are as nearly uniform as possible.

One practice of the prior art to obtain desired mixtures and blends of fibers has been to determine by known techniques and/or methods of classification, the characteristics of the various fibers in a bale. When the characteristics of several bales of fiber are known, it is possible to determine readily the amounts and percentages of the various bales which should be mixed and blended to obtain a yarn or cloth of certain desired characteristics.

Prior to the invention disclosed and claimed in U.S. Patent No. 2,938,239, issued May 31, 1960, the industry, in attempting to mix and blend fibers from many different bales, instructed the operator to take certain amounts of fibers manually from each of the bales and place such lots of fibers in blenders. While this procedure—usually but by no means always—resulted in the placing of fibers from the several bales into the blender, it was not completely satisfactory because of the uncertainty of the human element. Time after time the fibers so placed in the blender did not contain the desired amounts of fibers from each of the bales. Also, these fibers usually were not sufficiently open so as to be readily and thoroughly blended. Consequently, a demand existed for automatic mechanical means for continuously opening a plurality of bales of fibers, for removing from each of the bales an exact amount of fibers to obtain a mixture of correct proportions, and for assembling the proportioned amounts of fibers into sandwich form before entering the blender.

The invention of U.S. Patent No. 2,938,239 constituted a great improvement in the industry, since it first met the demand for an automatic method and apparatus for opening and blending in correct proportions fibers from a plurality of bales of fibers. As more fully disclosed in the aforementioned patent, that apparatus generally includes a plurality of spaced conveying tables which are disposed in a row to form a fiber line. The ends of adjacent conveying tables are connected by bridges, which had their upper surfaces positioned above the upper surfaces of the tables, and below each of these bridges is disposed a rotatable plucker having a plurality of sharp, protruding pins adapted to extend through slots in the bridge.

In operation of the apparatus, the bales are reciprocated back and forth from one conveying table to the next over the bridges and pluckers. At the same time, the pluckers are rotated to remove from the bottom surfaces of the several bales small tufts of fibers which are projected downwardly onto a continuously running conveyor belt to form a mat consisting of layers of the fibers in sandwich form. This mat of fibers then is fed by the conveyor belt into a blender.

Among the distinct advantages of the above-described apparatus is a uniform blending of the fiber tufts that are simultaneously removed from the several bales by the plucker devices and deposited on the conveyor belt. Further, very little manual labor is required to substantially completely open the bales. The reciprocating movement of the bales over the raised bridges is beneficial in this respect, since it tends to prevent the development of "grooving" in the lower surfaces of the bales. As is known to those familiar with the art, grooving may be created when, after a period of time, the rows of pins on the plucker devices remove substantially all of the fibers being presented to each row of pins. Should this happen, further removal of the fiber tufts becomes virtually impossible because of the ridges of fibers which exist between each row of pins. With the apparatus disclosed in Patent No. 2,938,239, the raised bridges and the movement of the bales over the bridges tend to remove the ridges of fibers between the rows of plucker pins.

In spite of the improvements over the prior art which are obtained with the above-described apparatus, it became apparent during its early commercial development and use with many different types of fibers that a need existed for a construction that would more completely eliminate grooving. Also, it was found that with certain types of fibers the raised bridges heretofore used could "peel" or strip a layer of fibers from the bottom surfaces of the bales as the bales were moved over the side edges of the bridges. The fiber layers which were stripped from the bales tended to roll up beneath the bales against the edges of the bridges. When such "roll-ups" occurred, precautions had to be taken to remove the pieces of material, since, if the condition persisted, the operation and performance of the apparatus could be affected.

Roll-ups of certain types of fibers also could occur in certain applications due to a tendency of the plucker pins to penetrate into the bales and shear small layers of fibers from their bottom surfaces. The movement of the bales over these sheared layers of fibers tended to form them into tightly packed cylindrical rolls which, unless removed, would remain on the bale conveying tables and/or would lodge against the bridge members. As the bales continued to move back and forth, these undisposed rolls of fibers on the tables would roll beneath the bales or would roll out and then back under the bales so as to bump, distort and even topple them. Also, as the weight of the bales became lighter because of the removal of fiber tufts, the fiber rolls eventually could raise and hold the bales out of further contact with the plucker devices, thus materially decreasing the rate of fiber production.

A mutual solution to the problems of positively eliminating grooving and, at the same time, preventing roll-ups was not at all obvious. For example, the bales could not be held stationary since this would only accentuate the development of grooving, even though roll-ups would be eliminated. Likewise, it was recognized that, if the edges of the bridges were lowered below the surfaces of the conveying tables to prevent stripping, there would be no means for breaking up the fiber ridges which tend to develop between the rows of plucker pins.

The present invention avoids both of the foregoing disadvantages, and others, by maintaining a selected downward pressure on the bales as they are reciprocated over the bridges in engagement with the pins of the plucker devices, and by simultaneously providing for a reduction in the fiber density in the vicinity of the plucker devices. In this manner, fresh supplies of fibers in the bales are, in effect, continuously fed to the plucker devices without any tendency toward the development of grooving. Thus, the invention obtains a high, constant and uniform production rate of fiber tufts and provides for dependable performance of the apparatus wherein the tufts are removed uniformly over the entire bottom surfaces of the bales.

According to the preferred embodiment of the invention, the bridges are disposed entirely below the surfaces of the bale conveyors. As will more fully be discussed, this construction permits the portions of the bales over the bridges to sag downwardly so that the fibers in these areas can expand and thus achieve the desired reduction in the fiber density. The selected pressure on the bales is achieved with a traveling bale cage that both supports the bales and carries a vertically movable, bale hold-down platen which is operatively engageable with the tops of the bales. The downward force produced by the bale platen preferably is controlled to maintain a constant pressure between the bales and the plucker devices. As a result, the fibers from the bales are caused to feed at a uniform and controllable rate from the pluckers. The traveling bale cage preferably is conjointly reciprocal with the conveyors so that the pressure on the bales can be maintained throughout their path of movement.

The construction in which the bridges are disposed below the bale conveyors also contributes to the high, uniform production rates that are attainable with the invention by preventing the occurrence of roll-ups beneath the bales. Since the bridges are below the path of travel established by the bale conveyors, the fibers will not be stripped from the bales and accumulated at the sides of the bridges. Instead, the fiber tufts are continuously and uniformly plucked from the bales and deposited on a moving conveyor.

The apparatus of the present invention, as well as additional advantages, will be better understood by those skilled in the art from the following specification read in conjunction with the accompanying drawings, in which.

Figure 1:
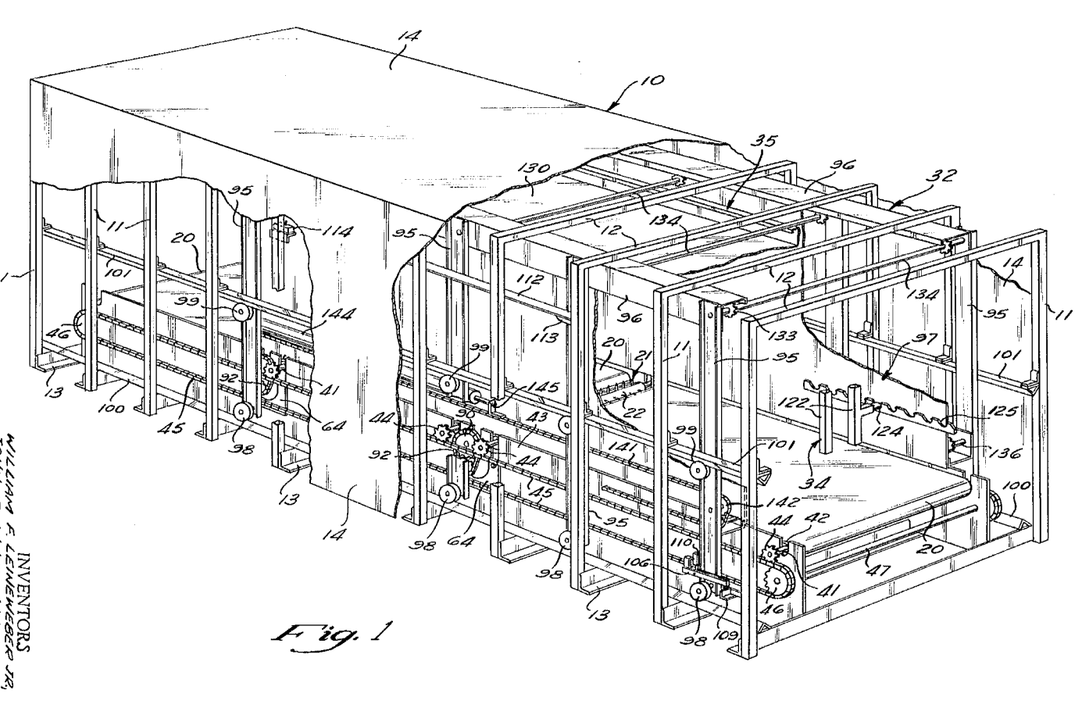
FIGURE 1 is a perspective view, with portions broken away, of the bale opening and blending apparatus of the invention.
Figure 2:
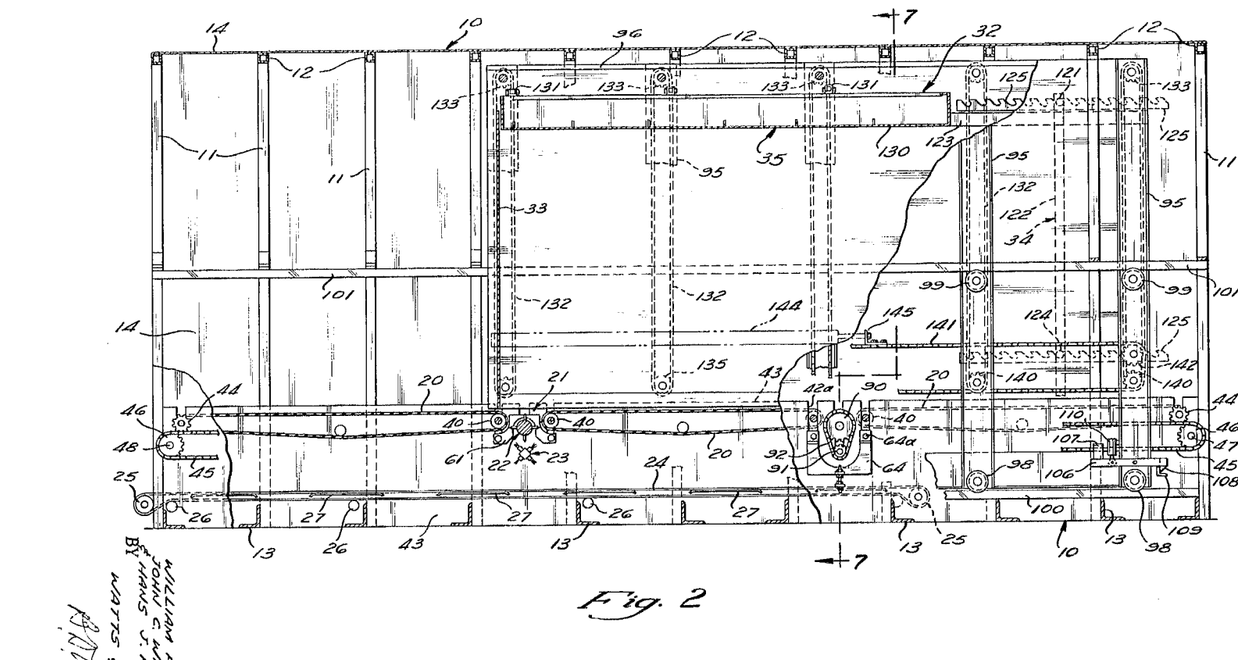
FIGURE 2 is a side elevational view, partially in cross-section, of the apparatus illustrated in FIGURE 1.

Referring now to the drawings and to FIGURES 1 and 2 in particular, the general construction of the invention will be seen to include a stationary frame 10. As shown, the stationary frame 10 is formed by a structural framework made up of vertical, longitudinally spaced side beams 11, transversely extending cross beams 12 secured to the upper ends of the side beams, and transversely extending bottom beams 13 secured to the lower ends of the side beams. The sides and top of the structural framework may be enclosed, as designated by reference numeral 14 in FIGURE 1.

Figures 3, 9:
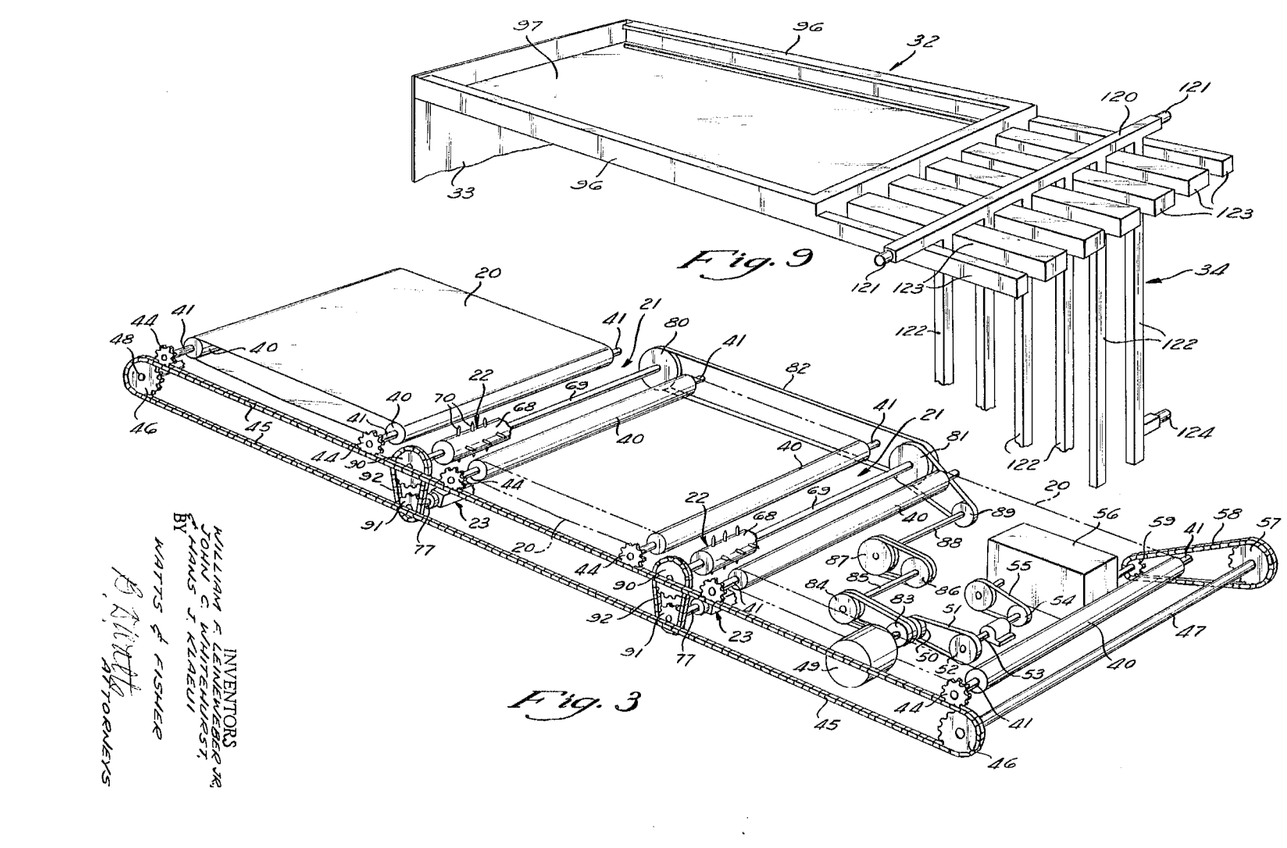
FIGURE 3 is a diagrammatical perspective view of the conveying and plucking mechanism of the apparatus.
FIGURE 9 is a perspective view of the top portion of the traveling cage and also illustrates the removable end gate.

The stationary frame 10 supports a plurality of conveyors 20 which define a substantially horizontal path of travel for a plurality of fiber bales. The path of travel defined by the conveyors 20 is interrupted longitudinally by relatively small, transverse spaces 21 (FIGURE 3). Within each 21, and preferably below the path of travel, is disposed a plucker 22 and a cooperating doffer 23. As will hereinafter be more fully described, the pluckers 22 pluck small tufts of fibers from the bales as they are moved by the conveyors over the spaces 21. According to the preferred arrangement, the tufts of fibers removed from the pluckers by doffers 23 are directed toward an endless conveyor 24 below the doffers for the formation thereon of a substantially continuous mat composed of horizontal, superimposed layers of fibers taken from the several bales. In an alternative embodiment of the invention, a suitable pneumatic conveying system is provided in place of the conveyor 24.

As is shown most clearly in FIGURE 2, the conveyor 24 is an endless belt which extends longitudinally of the frame 10 near its bottom. The belt is entrained around end rollers 25, one of which may be driven by any suitable means (not shown). The lower flight of the conveyor belt may be supported by intermediate idler rollers 26 and the upper flight by transversely extending, longitudinally spaced plates 27 secured between the sides of the frame 10.

As more fully described in U.S. Patent No. 2,938,239, a blender (not shown) may be disposed in operative conjunction with one end of the conveyor 24 to receive the mat of fibers removed from the bales. The apparatus of the invention also can be used to feed cleaners, feeders and other types of equipment.

The bale cage 32 is mounted on the frame 10 around the conveyors 20 for movement in the direction of travel of the bales on the conveyors. At one end of the bale cage 32 is a fixed end wall 33 and at the opposite end is a movable wall formed by a removable gate 34. As is more fully discussed below, the gate can be removed from the cage to permit a plurality of fiber bales to be loaded on the conveyors 20 within the cage. Thereafter, the gate 34 can be adjustably positioned with respect to the end wall 33 to engage the bales therebetween.

In the preferred embodiment, the bale cage 32 also includes a vertically movable, bale hold-down platen 35 which is disposed over the conveyor 20 and is substantially coextensive therewith. After a plurality of bales of fibers have been arrayed on the conveyors 20, the platen 35 can be lowered to engage the tops of the bales and exert a controlled pressure selected to obtain a uniform production rate of the fiber tufts.

Having in mind the foregoing general construction of the invention, the several components will now be discussed in detail.

*Bale conveying and plucker mechanism*

As shown most clearly in FIGURES 1, 2 and 3, the conveyors 20 are formed by endless conveyor belts which are aligned in spaced end-to-end relationship longitudinally of the frame 10. According to the preferred construction, the belts are of sufficient width to support two rows of bales arranged lengthwise on the conveyors in order to conserve floor space when the apparatus is installed. However, it will be understood that the width of the belts can be such as to support only a single row of bales or more than two rows.

The endless belts 20 are supported by rolls 40 having axles 41 which project from the ends of the rolls. In the illustrated embodiment of the invention, the several axles 41 are rotatably mounted in bearing plates 42 (FIGURES 4 and 6) which are secured to longitudinally extending frame plates 43. These frame plates 43 form an integral part of the stationary frame 10.

Corresponding ends of the axles 41 extend through slots 42a in one of the frame plates 43 and are provided with sprockets 44. These sprockets 44 are in driven engagement with an endless chain 45 which extends along one side of the stationary frame 10. At the ends of the stationary frame, the chain 45 is entrained around sprockets 46 mounted on the ends of shafts 47 and 48. The shafts 47 and 48 are driven by reversible motor 49 that is mounted within the frame 10 below the belts 20. As shown in FIGURE 3, the motor shaft of the motor 49 carries a pulley 50 that is connected by a V-belt 51 to a variable pitch pulley 52 mounted on one end of a shaft 53. At the opposite end of the shaft 53 is another variable pitch pulley 54 which is connected by a V-belt 55 to a pulley on the shaft of a suitable gear reducer 56. This gear reducer 56 is shown as being operatively connected to the shaft 47 by a chain drive consisting of a sprocket 57 on the shaft 47 and a chain 58 which is engaged around the sprocket 57 and a sprocket 59 driven by the gear reducer.

Figure 4:
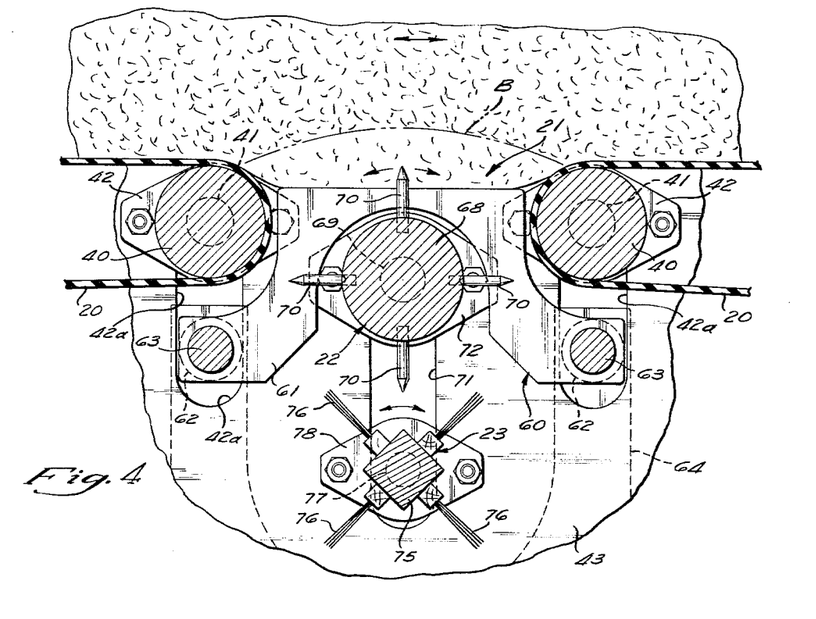
FIGURE 4 is an enlarged, fragmentary view of a portion of the mechanism illustrated in FIGURE 2.
Figures 5, 6:
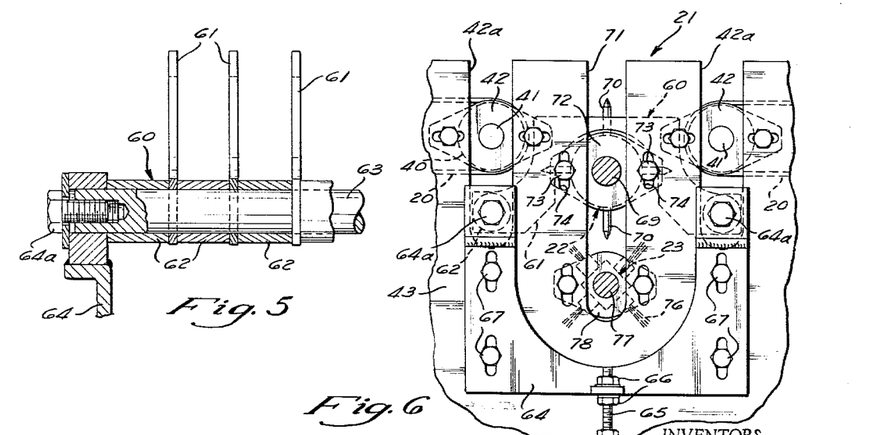
FIGURE 5 is a cross-sectional, fragmentary view of the structure illustrated in FIGURE 4.
FIGURE 6 is a fragmentary view showing the connection of the plucker devices, doffers and bridges to the frame of the apparatus.

A novel and improved, segmental bridge construction 60 spans each of the spaces 21 between the adjacent ends of the conveyor belts 20, the bridges being best shown in FIGURES 4, 5 and 6. In the illustrated embodiment, the bridges are formed by a plurality of inverted, substantially U-shaped plates 61 which are transversely spaced across the width of the conveyor belts 20. As will be seen, these plates define a plurality of slots extending longitudinally of the frame 10.

The bridge plates of each bridge 60 are held in position by securing their corresponding legs to sleeves 62 which are mounted over rods 63. Corresponding ends of the rods 63 of each bridge extend through the slots 42a in the frame plates 43 on each side of the stationary frame and are secured to the legs of a pair of U-shaped, adjustable plate structure 64, as by bolts 64a. These plate structures 64 are vertically adjustable so that the height of the bridges 60 can be adjusted relative to the conveyors 20. To this end, each plate structure is shown as being connected to the frame plates 43 by a threaded shaft 65 and cooperating nuts 66. Suitable means, such as bolts 67, are provided for securing the plate structure 64 in their adjusted positions.

The pluckers 22 which are disposed in the spacers 21 extend between the legs of the bridge plates 61 across the width of the stationary frame. In the preferred construction of the invention, each plucker 22 is formed by a rotatable cylindrical drum 68 mounted on a shaft 69.

The drum 68 carries a plurality of axially extending rows of pins 70. These pins are operatively disposed in the slots of the bridges 60 and are of sufficient length to project upwardly between the bridge plates 61 into engagement with the fiber bales that are carried over the bridges. As best seen in FIGURE 4, the pluckers 22 are positioned so that the ends of the pins 70 are above the upper surfaces of the bridges.

The ends of the plucker shafts 69 extend through slots 71 in the frame plates 43 and are rotatably mounted in bearing plates 72. As shown in FIG. 6, these bearing plates are connected to the frame plates by bolts 73 which extend through vertical slots 74. By means of this construction, the height of the pluckers 22 and the distance that the pins 70 project upwardly through the segmental bridges 60 can be adjusted to obtain the desired rate of fiber production from each of the bales on the conveyor 20.

The doffers 23, one of which is disposed below each plucker, each include a rectangular body 75 having a plurality of brushes 76 for removing tufts of fibers from the plucker pins 70. As shown, each body member 75 is mounted on a doffer shaft 77. The ends of the shafts 77 also extend through the slots 71 of the frame plates 43 and are rotatably mounted in bearing plates 78. These bearing plates 78 are connected to the frame plates 43 in a manner similar to the previously described bearing plates 72 for the pluckers. Thus, it will be seen that the pluckers 22 and doffers 23, as well as the bridges 60, are each adjustable up and down independently of each other.

The mechanism for operating the plucker and doffer devices is best shown in FIGURE 3. According to the illustrated construction, corresponding ends of the several plucker shafts 69 are provided with pulleys 80 and 81, the pulleys being operably connected by a V-belt 82. When the apparatus is constructed to include more than two pluckers, it has been found desirable to use a single connecting V-belt between each pair of adjacent plucker shafts. Accordingly, it will be understood that, in such a construction, the pulleys on the intermediate plucker shafts will be of the double-groove type.

As shown in FIGURE 3, the pulley 81 is of the double-groove type and is connected by a suitable belt drive arrangement to the motor 49. The belt drive may include a centrifugal clutch pulley 83 on the motor shaft which is connected by a V-belt to a variable pitch pulley 84 carried by a shaft 85. A second variable pitch pulley 86 on the shaft 85 drives a pulley 87 on a jack shaft 88. The jack shaft 88 carries another pulley 89 which is connected by a V-belt to the plucker shaft pulley 81.

On the ends of the plucker shafts opposite the pulleys 80, 81 are located chain drives for the several doffers 23. Each such chain drive is formed by sprocket 90 on the plucker shaft and a sprocket 91 on the on the adjacent doffer shaft 77, the sprockets being connected by a chain 92. It is preferred that the sprockets 90 and 91 be of such a size as to provide a 2:1 ratio of doffer to plucker.

According to the preferred arrangement, the conveyors 20, the pluckers 22 and the doffers 23 will be rotatably driven in the same, but alternatively opposite direction by the motor 49. The reversible motor 49 is energized in one direction for a sufficient time to move each of the fiber bales from one conveyor belt across one of the bridges 60 to the adjacent conveyor belt. Thereafter, the motor is reversed to move the bales back across the bridges. As the bales are thus reciprocated across the bridges, the pluckers, which are rotating in the same direction as bale movement, remove tufts of fibers from the bottom surfaces of the bales substantially uniformly over their full length and width. The tufts of fibers removed by the plucker pins are projected by the doffers 23 downwardly onto the conveyor belt 24.

While it is possible, of course, to construct the drive so that the pluckers and doffers will be rotated continually in the same direction and only the drive of the conveyor belts 20 is reversed, experience has shown that several advantages can be obtained by reversing the drive of the pluckers to coincide with the reciprocating bale movement. When the plucker devices 22 are rotated in the same direction as that in which the bales are moved, the pluckers aid in propelling the bales instead of acting against bale movement. Perhaps more important, the speed of the rotating pluckers relative to the bales remains constant. This constant relative speed is an important factor in obtaining a steady, uniform production rate of fiber tufts during movement of the bales in both directions. Another advantage of reversing the plucker devices is that tufts of fibers which otherwise might accumulate between the pins 70 will be removed.

Figure 10:
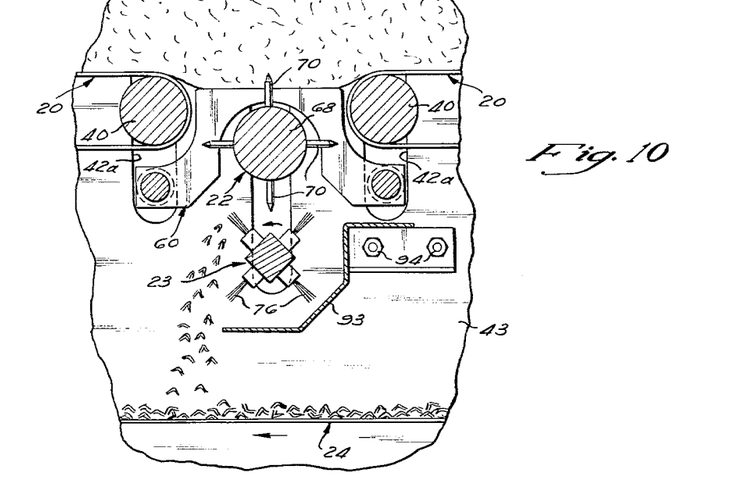
FIGURE 10 is a cross-sectional, fragmentary view similar to FIGURE 4 of a modified embodiment of the invention.

As noted above, the tufts of fibers removed from the bales by the pluckers 22 are deposited on the continuous running conveyor belt 24 by the doffers 23. It has been found that, when the conveyor is spaced only a relatively small distance below the doffers and is moving in the same direction as the bale conveyors 20, the wind created by the rotating doffers may tend to blow the tufts of fibers back against the direction of conveyor movement, thus producing a non-uniform distribution of fibers on the conveyor 24. In order to prevent such an occurrence, there is shown in FIG. 10 a transversely extending baffle 93 which is connected between the side frame plates 43, as by bolts 94, below and at one side of each doffer device 23. Assuming that the conveyor 24 continually runs to the left, as viewed in FIGURE 10, the several baffles will be disposed on the right sides of the doffers. Thus, the baffles will prevent the doffers from blowing tufts of fibers against the direction of movement of the conveyor 24 when the doffers are rotated in a counterclockwise direction.

*Traveling bale cage and hold-down mechanism*

The preferred construction of the traveling bale cage 32 is most clearly shown in FIGURES 1–2 and 7–9. As there illustrated, the traveling bale cage is formed by spaced upright side beams 95 which are connected at their upper ends by longitudinally extending beams 96. If desired, the sides and top of the bale cage may be enclosed, as generally indicated by reference numeral 97 in FIGURE 1.

The side beams 95 of the bale cage carry rollers 98 at their lower ends. Corresponding rollers 99 are connected to the side beams between their tops and bottoms. The rollers 98 and 99 preferably are grooved to cooperate with guide rails 100 and 101, respectively, which are secured to the side beams 11 of the stationary frame 10. In this manner, the bale cage 32 is guided for movement in the direction of the path of travel defined by the conveyors 20.

In the preferred embodiment, the bale cage 32 is driven conjointly with the conveyor belts 20 and to this end, an arm 106 is pivoted at its center to the lower end of one of the beams 95 (see particularly FIGURE 2). This pivot arm 106 has a tooth 107 at one end which is adapted to be lockingly engaged with the chain 45 (FIGURE 1). At the other end of the pivot arm 106 is a finger 108, which is adapted to cooperate with an angle bar 109 on the frame 10. When the pivot arm is swung in one direction, the tooth 107 will engage the chain 45 so that the bale cage will be driven by the chain concurrently with the belts 20. When the pivot arm 106 is swung in the opposite direction, the tooth 107 will be released from the chain and the finger 108 will be moved into engagement with the angle bar 109 to lock the bale cage in a fixed position. In order to actuate the pivot arm in either direction, a small hydraulic cylinder 110 is mounted on the side beam 95 of the bale cage and the piston rod 111 of the cylinder (FIG. 8) is connected to one end portion of the pivot arm.

Figure 7:
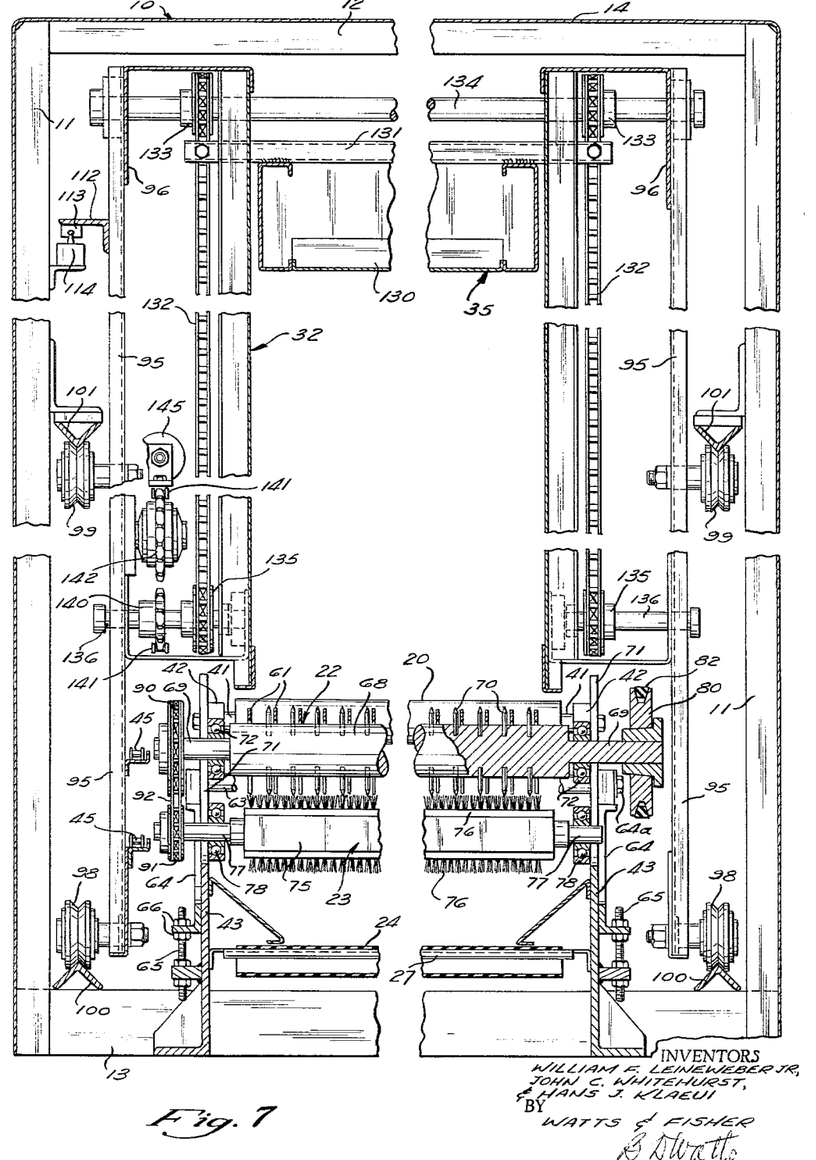
FIGURE 7 is a cross-sectional view taken along the line 7—7 of FIGURE 2.

As is most clearly shown in FIGURES 1 and 7, a horizontally extending bar 112 having a length slightly greater than each conveyor 20 is secured to one side of the traveling cage 32. This bar 112 has cams 113 at each end for actuating a control switch 114 that is fixed to the frame 10 and in circuit relation with the reversible motor 49. When the tooth 107 has been placed in engagement with the chain 45 and the motor 49 has been energized, the traveling cage will be driven in one direction until the cam 113 at one end of the bar trips the switch 114. This reverses the motor 49 and drives the cage in the opposite direction until the cam at the other end of the bar 112 trips the switch so that the motor is again reversed. Thus, it will be apparent that the drives for the traveling cage 32, the conveyor belts 20, and the pluckers 22 are actuated in a common, but alternately opposite direction, by the same motor 49. It is to be understood that other drive mechanisms may be provided for the cage 32. For example, the cage can be driven by a belt or chain drive which is actuated independently of the conveyors 20.

As previously discussed, the traveling bale cage 32 has a fixed end wall 33 at one end and a movable wall formed by a removable end gate 34 at the opposite end. Referring particularly to FIGURE 9, the illustrated construction of the gate 34 is shown to include a transversely extending top bar 120 from which depend spaced, vertical bars 122. The vertical bars 122 of the gate are loosely interfitted between longitudinally extending beams 123 which form a part of the top of the traveling cage 32. This construction is such that the gate can be adjustably moved toward and away from the fixed end wall of the cage.

In order to fix the gate 34 in any adjusted position, the ends of the bar 120 are provided with extending end pins 121. Similar pins 124 extend from the bars 122 on opposite sides of the gate. These pins 121 and 124 may be engaged within longitudinally extending racks 125 fixed to opposite sides of the inner sides of the traveling cage 32 (FIGURES 1 and 2). In use, the gate 34 can be easily removed from the bale cage 32 to permit a plurality of bales to be arrayed on the conveyor belts 20. After this has been done, the gate of the bale cage is positioned so that the bales are engaged between the gate and the fixed end wall 33, thus preventing endwise shifting movement of the bales on the conveyor belts.

Figure 8:
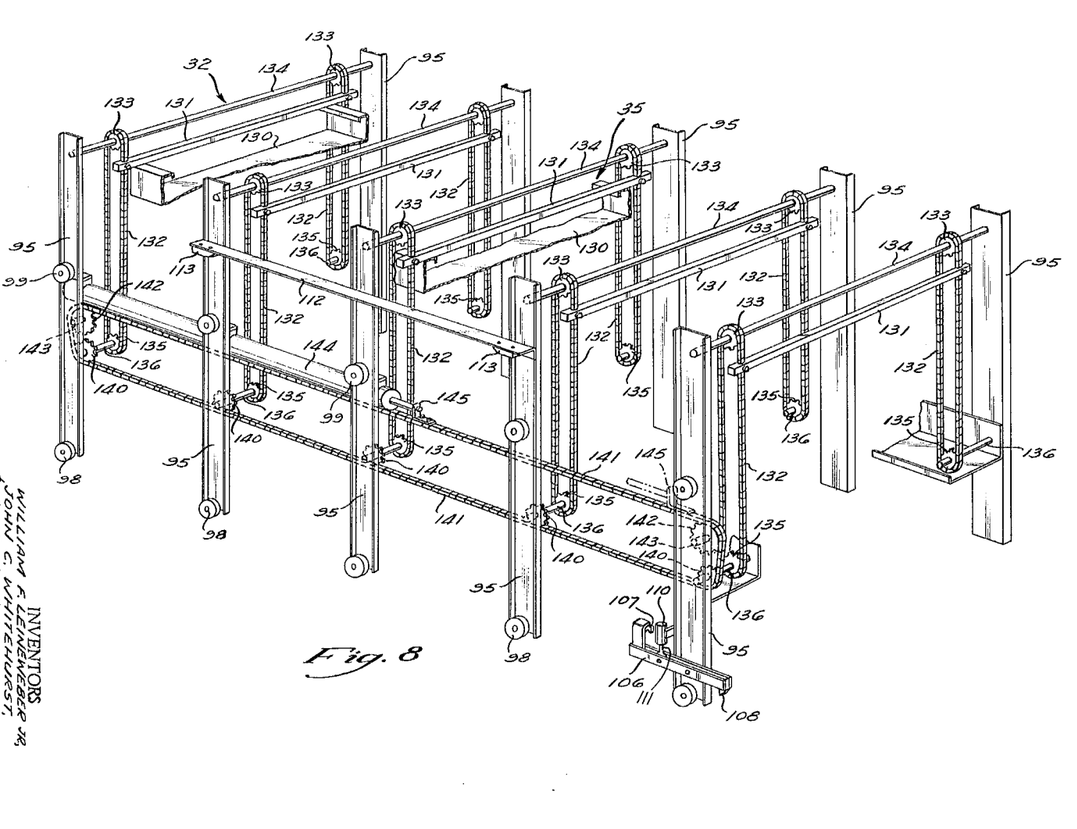
FIGURE 8 is a fragmentary perspective view, with portions broken away, of the traveling bale cage and vertically reciprocal clamp.

The vertical hold-down platen 35 is formed by a horizontal hold-down plate 130 which is substantially coextensive with the length of the traveling cage. As shown in FIGURES 2, 7 and 8, this hold-down plate 130 is supported by transversely extending beams 131 which have their ends connected to vertical drive chains 132 disposed along each side of the traveling cage. The several drive chains 132 are entrained around sprockets 133 carried at the ends of transverse shafts 134 which are rotatably mounted in the upper ends of the side beams 95 of the bale cage 32. At their lower ends, the chains 132 are entrained around sprockets 135 on relatively short shafts 136 which also are rotatably mounted on the bale cage below the shafts 134.

The short shafts 136 on the left side of the bale cage, as viewed in FIGURE 8, also carry sprockets 140 which are drivingly interconnected by the lower flight of a chain 141. The endless chain 141 is entrained around end sprockets 142 mounted on stub shafts 143 that extend from the side beams 95 of the bale cage.

In accordance with the preferred construction of the invention, the chain 141 is actuated by a hydraulic cylinder mechanism 144 which is secured to one side of the traveling cage, the piston rod of the cylinder 144 being connected to the upper flight of the chain 141 by a bracket 145. When the piston rod of the cylinder 144 is actuated to the dot-dash position illustrated in FIGURE 8, the chain 141 will be driven to lower the hold-down platen 35 against the array of bales on the conveyors 20. Actuation of the cylinder mechanism in the opposite direction causes the hold-down platen to be raised to permit loading of the bales on the conveyors.

Operation

Figure 14:
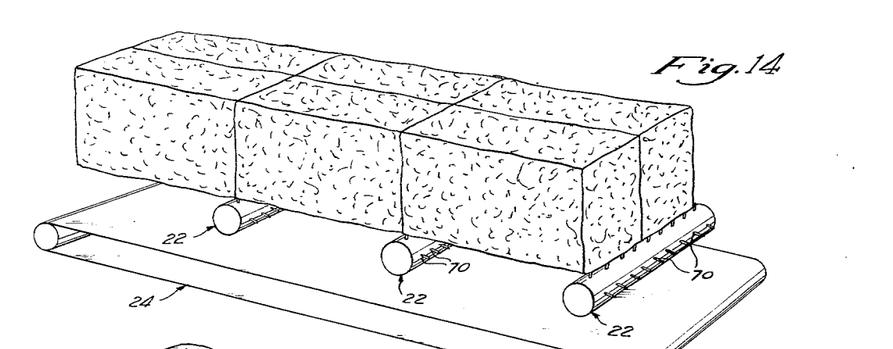
FIGURE 14 is a schematic view, diagrammatically illustrating the preferred method of arranging the bales of fibers in the apparatus.

In accordance with the preferred manner of operating the novel and improved bale opening and blending apparatus of the invention, a plurality of bales of fibers are arranged lengthwise in one or more rows on the conveyors 20 in the manner illustrated in FIGURE 14. It will be understood that, with this preferred bale arrangement, there is one plucker device for each bale in a row so that tufts of fibers will be plucked simultaneously from each bale and deposited in layers on the conveyor 24.

Figure 15:
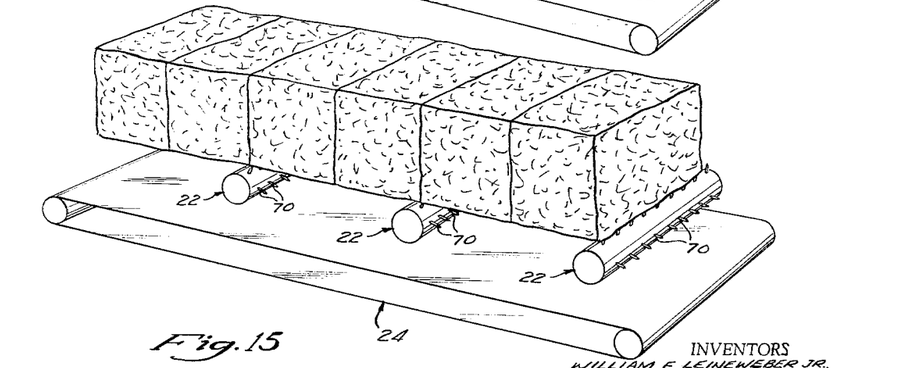
FIGURE 15 is a schematic view, diagrammatically illustrating a modified method of arranging the bales of fibers.

Alternatively, the bales can be arranged sidewise on the conveyors 20 in the manner illustrated in FIGURE 15. Since the length of the fiber bales usually varies less than the other dimensions, this alternative bale arrangement assures that the bales will be firmly confined between the sides of the traveling cage 32 so as to prevent their shifting and disintegrating during operation of the apparatus. It will be seen, however, that with this arrangement, tufts of fibers will be delivered simultaneously from only one-half of the bales. In order to obtain a mixture having a desired proportion of fibers from all of the bales and to collect all of the fibers in sandwich form on the conveyor 24, the conveyor 24 can be controlled so that it is stationary or creeping during movement of the bales in one direction, or the conveyor can be reversed with bale movement. It is also possible, of course to double the number of plucker devices 22 so that there is one plucker device for each bale.

When the bales of fibers have been arranged on the conveyors 20, the end gate 34 is positioned so that the bales are firmly engaged between the gate and the fixed end wall 33. Complete confinement of the bales is then obtained by lowering the bale hold-down platen 35.

Subsequently, the reversible motor 49 is energized so that the pluckers, doffers, conveyor belts and the traveling cage are driven toward one end of the stationary frame 10 to move the bales over the bridges 60. As the traveling bale cage 32 reaches the end of its path of travel, one of the cams 113 will trip the switch 114 and reverse the motor 49. This results in all of the elements being driven in the opposite direction toward the other end of the stationary frame 10. This reciprocating operation is repeated until all of the bales have been run-out by the pluckers 22.

It will be understood from the foregoing description of the apparatus that the plucker devices 22 will remove substantially uniform quantities of fibers as the bales are moved back and forth over the bridges 60. The fibers are removed over the entire width and length of the bales and are collected in sandwich form on the conveyor 24.

As generally described above, one particularly important advantage that is obtained with the invention is the improved action in removing the fiber tufts from the bales, such action being dependent in part upon the segmented construction of the bridges 60 and their location with respect to the conveyors 20.

In accordance with the preferred arrangement of the invention, the bridges are positioned a selected distance, as for example, one-half inch, below the upper surfaces of the conveyors. Referring to FIGURE 4, it will be seen that the spacing of the bridges relative to the conveyors effectively reduces the confinement of the segments of the fiber bales between the conveyors 20 so that the segments will sag or expand downwardly on the bridges 60 to provide a "breathing chamber," as generally designated by the broken line B. In sagging or "breathing" downwardly, a slight reduction in the density of the fibers is advantageously created in the zone of contact by the plucker devices 22. This reduction in the density of the fibers provides for a proper relationship between the plucker pins 70 and the fibers in the bales and thus substantially eliminates grooving and roll-ups as otherwise might occur if the fibers were tightly packed together. As a result, a steady rate of production or removal of the fiber tufts can be maintained. The segmented construction of the bridges 60 also contributes to the elimination of roll-ups since the bridges cannot strip layers of fibers from the bales as discussed above.

Another important feature resides in the bale cage construction 32 and the action of the bale hold-down platen 35. It will be apparent that the weight of the bales will constantly diminish because of the removal of fiber tufts. Without the platen 35, the rate of fiber production or removal also would decrease when the bales are approximately half gone, since the weight of the bales and the pressure exerted by the columns of fiber over the plucker devices will be insufficient to obtain the optimum engagement and penetration of the plucker pins. This difficulty is obviated with the present invention by gradually increasing the pressure exerted by the hold-down platen on the bales so as to maintain constant pressure between the bales and the plucker devices. In this manner a constant rate of fiber production is maintained as the bales are run out. With the disclosed arrangement, the pressure exerted by the hold-down platen can be easily controlled and gradually increased by utilizing a conventional variable-displacement pump (not shown) to supply liquid to the hydraulic cylinder 144.

Satisfactory results also can be obtained by using a riding dead weight on the bales instead of the preferred pressure controlled hold-down platen 35. In such instances, however, the consistency in the production rate of fiber tufts cannot be as precisely controlled as when the variable pressure hold-down platen is used. The use of the variable pressure hold-down platen also makes it possible to determine the time required to consume all of the bales and to have the bales all consumed simultaneously.

The total confinement of the fiber bales which is provided by the traveling cage, the hold-down platen, and the conveyors 20 also contribute to an improved uniform operation by providing bale stability. Since the bales are prevented from shifting on the conveyor 20 as the bales are moved back and forth over the plucker devices 22, the bales can be run out to the last layer of fibers without disintegration of their shape.

Because of the individual adjustment which is provided for the pluckers 22, the doffers 23, and the bridges 60, and because of the variable speed drive for the conveyors, pluckers and doffers, it is possible to obtain the desired and optimum pin engagement with the bales which will result in relatively high fiber production or removal rates. Further, such production rates can be varied readily.

Modifications

Figure 11:
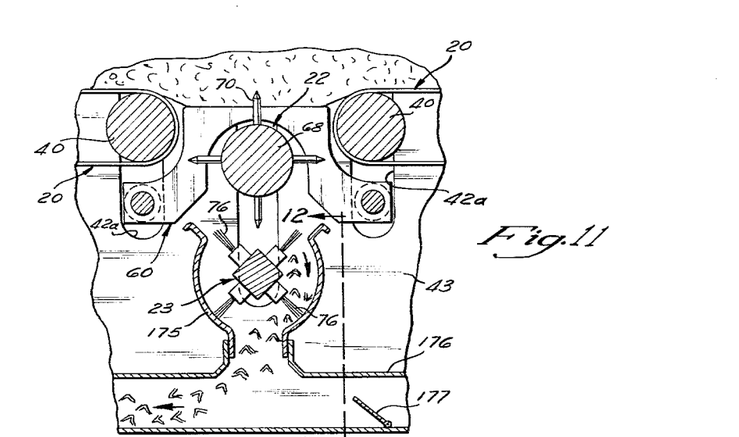
FIGURE 11 is a cross-sectional, fragmentary view similar to FIGURE 4 of still another embodiment of the invention.
Figure 12:
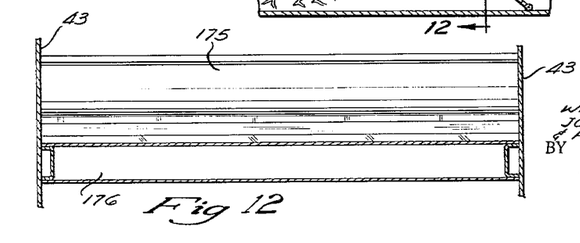
FIGURE 12 is a vertical cross-sectional view taken on line 12—12 of FIGURE 11.

As pointed out above, the lower conveyor 24 on which the fiber tufts are collected can be replaced by a pneumatic conveying system that is designed to feed the fiber tufts to associated apparatus. One such system is illustrated in FIGURES 11 and 12. As shown in FIGURE 11, a doffer vacuum seal bowl 175 is provided for each plucker device and doffer assembly 22, 23 with the doffer being disposed in the bowl. In order that a minimum air volume will be required for operation of the system, the doffer bowls 175 preferably are rectangular in vertical cross-section and have as small a height as possible. The doffer bowls extend across the apparatus coextensive with the doffers 23 and have their ends secured to the frame plates 43.

The several doffer bowls are connected to a single, longitudinally extending conduit 176 in which a negative air pressure is created. The doffer brushes 76 which sweep around the inside surfaces of the bowls 175 serve as sealing blades which minimizes the entrance of air through the tops of the bowls. The flow in the conduit 176 may be controlled by an adjustable baffle 177 which is preferably disposed near the entrance end of the conduit.

In operation the fiber tufts from the several doffers are collected in the conduit 176 so that they can be conveyed to any desired location or apparatus. Another advantage which this pneumatic system offers is that the negative pressures created below the bridges 60 improves the removal of fiber tufts and also eliminates dust and fly created by the plucker devices engaging the bales. Further, since the pneumatic system takes care of collecting or sandwiching fibers from all of the bales, it can be used to advantage with the successive plucking method discussed above in conjunction with FIGURE 15.

Figure 13:
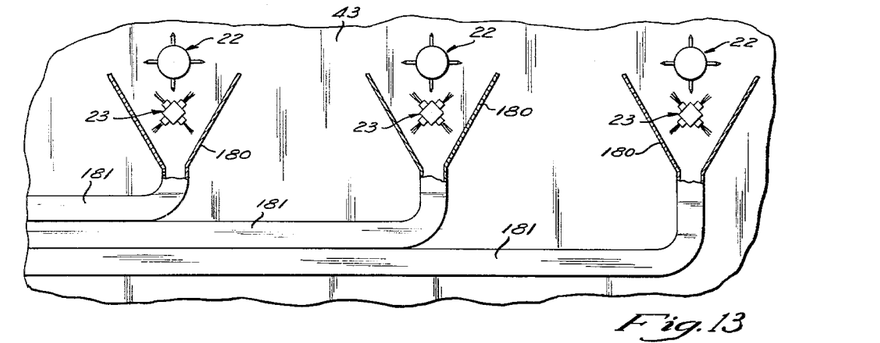
FIGURE 13 is a fragmentary, cross-sectional view of still another embodiment of the invention.

FIGURE 13 illustrates a modified pneumatic conveying system. In this modified embodiment, a doffer bowl 180 is disposed below each doffer 23 as in the embodiment of FIGURE 12. However, each of the several bowls is connected to a separate conduit 181, the conduits being manifolded into a common header (not shown). Air is drawn into the conduits through the outwardly flaring upper ends of the doffer bowls.

Figure 16:
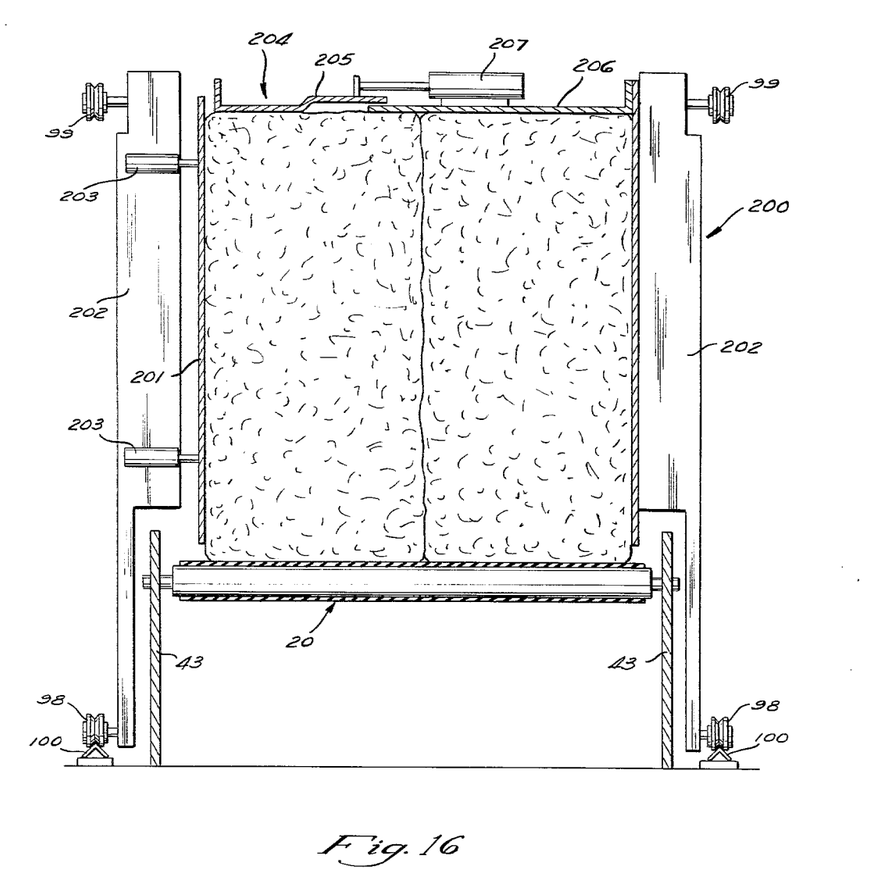
FIGURE 16 is a schematic view illustrating still another embodiment of the invention.

Since all bales will vary slightly in weight and may have different centers of gravity depending upon where and how the bales are ginned, the bales will have a tendency to shift on the conveyors 20 unless the bales are rigidly confined by the bale cage 32 and the hold-down platen 35. As has been previously discussed, the dimensions of the bales also may vary and, therefore, the desired rigid confinement may be difficult to obtain in some instances, as with the bale arrangement illustrated in FIGURE 14. In order to overcome this difficulty, there is schematically shown in FIGURE 16 a modified construction 200 of the bale cage in which the cage is provided with an adjustable side plate 201. In addition to permitting confinement of bales of varying widths, this adjustable side plate provides positive guidance of the bales when loaded in the preferred lengthwise manner.

As shown, the side plate 201 is connected to the vertical side frame members 202 of the cage by any suitable adjustment means 203. This adjustment means 203 can take the form of screw-type arrangements which are either individually or collectively adjustable, or the adjustment means can be spring or pneumatically operated devices.

In order to accommodate changes in the width of the bale cage 200, the bale hold-down platen 204 also is made adjustable. To this end, the platen is formed in two longitudinally extending members 205 and 206. These platen members are connected by suitable adjusting means 207 which may be similar to the adjusting means 203.

Figure 17:
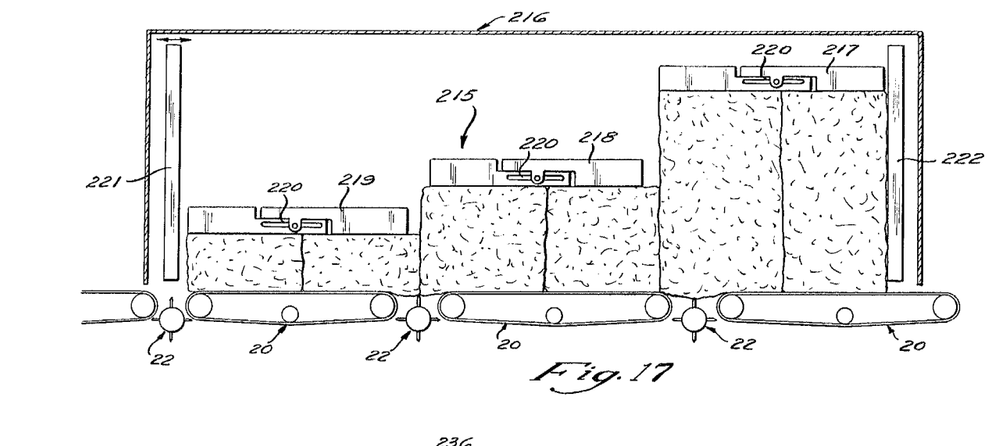
FIGURE 17 is a schematic view illustrating still another modification of the invention.

Referring now to FIGURE 17, there is shown a modified hold-down platen construction 215 for the bale cage which is generally designated by reference numeral 216. In the desired operation of the preferred form of the invention, the apparatus is loaded with full bales which are simultaneously run out. However, in some instances it may be desirable to intermittently load new bales before other bales have been completely run out in order to reduce the down-time of the apparatus. To this end, the bale hold-down platen 215 is formed as a plurality of separate members designated as 217, 218 and 219. Preferably, the platen members are of sufficient length to engage two adjacent bales in a row, and, if desired, may be provided with longitudinally adjustable joint constructions 220 so that the platen members can be adjusted to accommodate bales of different widths. Instead of having a fixed end wall as in the preferred embodiment of the invention, the bale cage 216 may have an adjustable end wall 221 opposite the gate 222.

The several platen members are preferably actuated by separate variable pressure fluid actuators and chains (not shown) or other similar means designed to obtain constant engaging pressure between the bales and plucker devices 22; however, it will be understood that they can be riding dead weights on the bales. It also is possible to provide suitable means (not shown) so that the members 217, 218 and 219 can be connected together as a single unit to operate in the manner of the preferred platen construction 35.

With the illustrated arrangement partially consumed bales are first loaded on the conveyors 20 with full bales being the last in. Each time one or more of the partial bales have been totally consumed, the apparatus is stopped and the conveyor belts 20 are actuated to index each bale, or pairs of bales, as the case may be, further into the cage 216 under the next adjacent hold-down platen member. This permits full bales to be loaded at the entrance end of the apparatus. When indexing the bales further into the cage, the platen members 217, 218 and 219 may be first raised to permit movement of the bales and then lowered into operative position after the indexing and loading operation. Thus, it will be seen that only a relatively short loading time is required to obtain substantially continuous operation.

Figure 18:
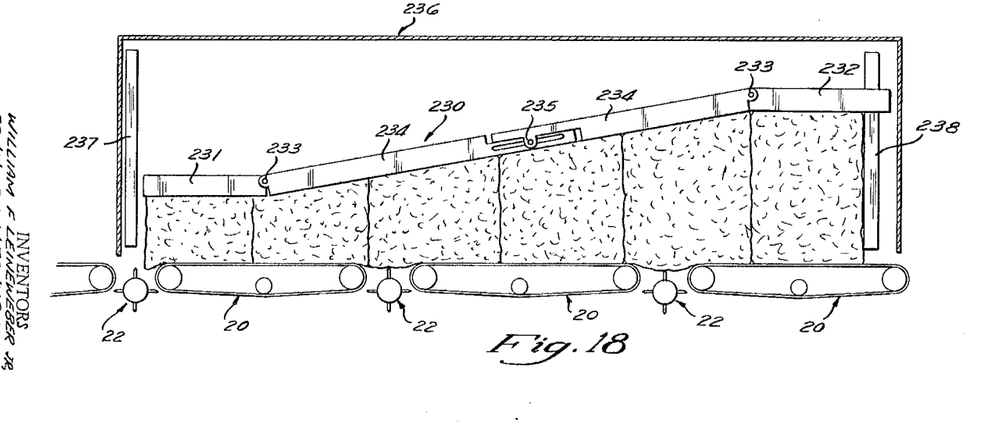
FIGURE 18 is a schematic view illustrating still another embodiment of the invention.

FIGURE 18 illustrates another modified hold-down platen construction 230 which provides for an operation similar to that discussed in conjunction with FIGURE 17. In this embodiment, the hold-down platen comprises a single member having end portions 231 and 232 which are connected by hinges 233 to a rearwardly and downwardly inclined center portion 234. If desired, the center portion 234 may be provided with a sliding joint construction 235 so that the platen can be disposed in a horizontal plane to function in the manner of the preferred platen construction 35. The platen 230 may be loaded by gravity or by variable pressure means (not shown).

In operation, partial and full bales are loaded into the cage 236 against the fixed end wall 237 and the gate 238 is placed in position. The apparatus then is operated until the partial bale under the platen end portion 231 has been run out, whereupon the conveyors 20 are actuated to index the bales further into the cage and against the end wall 237. This leaves a space for loading a full bale at the entrance end of each row. When indexing the bales further into the cage, the platen 230 is elevated to permit bale movement.

Having thus described this invention in such full, clear, concise and exact terms as to enable any person skilled in the art to which it pertains to make and use the same, and having set forth the best mode contemplated of carrying out this invention, we state that the subject which we regard as being our invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A bale opening and blending apparatus comprising reciprocating conveyor means for moving a plurality of bales of fibers through a substantially horizontal path of travel, said path of travel being interrupted by transverse spaces, bridge means across said spaces for supporting bales moved along said path of travel, frame means mounting said bridge means below said path of travel so that portions of the bales on said bridge means may breathe downwardly to effect a reduction in fiber density, plucker means connected to said frame means in said spaces for plucking small tufts of fibers from the portions of the bales on said bridge means, means connected to said frame means to remove tufts of fibers from the plucker means, drive means connected to said conveyor means for providing reciprocating movement of each bale of fibers over one of said bridge means, means connected to said frame means for collecting the tufts of fibers, and means connected to said frame means for rigidly confining a row of bales on said conveyor means, said confining means including relatively moveable wall means and means vertically moveable towards said conveyor means, and means mounting said confining means for movement with said conveyor means.

2. The apparatus as claimed in claim 1 wherein said confining means further includes means for actuating said vertically movable means so as to maintain substantially constant pressure engagement between the bales and said plucker means.

3. In a bale opening and blending apparatus including reciprocating bale conveyor means for moving bales of fibers through a substantially horizontal path of travel, and plucker means longitudinally spaced along said path of travel adapted to pluck small tufts of fibers from the surfaces of bales as they are reciprocated by said conveyor means, the improvement comprising a frame, a traveling bale cage, means mounting said cage on said frame for reciprocal movement corresponding to the movement of said conveyor means, said cage including hold-down means for clamping an array of bales on said conveyor means, and drive means carried by said frame for reciprocally driving said cage and said conveyor means.

4. The apparatus as claimed in claim 3 wherein said cage includes walls relatively movable toward and away from each other.

5. The apparatus as claimed in claim 3 wherein said hold-down means comprises vertically reciprocal platen means mounted in said cage above said conveying means, and means carried by said cage for moving said platen means into variable pressure engagement with the upper surfaces of bales arrayed on said conveying means and for maintaining substantially constant pressure engagement between said plucker means and the bales.

6. The apparatus as claimed in claim 5 wherein said cage comprises a fixed wall at one end of said cage, and a removable gate at the opposite end of said cage, said gate being adjustably positionable with respect to said end wall for engaging an array of bales therebetween.

7. A bale opening and blending apparatus comprising a frame, means connected to said frame for supporting an array of fiber bales for movement along a path of travel, a plurality of bridges spaced along the path of travel, each of said bridges including a plurality of spaced members defining a plurality of open slots, said bridges being connected to said frame so that their upper surfaces are below the upper surfaces of said supporting means, whereby portions of the bales over said bridges may breathe downwardly to effect a reduction in fiber density, a rotatable plucker connected to said frame below each bridge, each of said pluckers including a row of spaced plucker pins operatively disposed in said slots and adapted to extend into engagement with said bale portions of reduced fiber density, doffer means connected to said frame in operative conjunction with said pluckers, means below said plucker means for collecting tufts of fibers, a traveling bale cage reciprocally mounted on said frame for confining an array of fiber bales on said supporting means, and means for actuating said bale cage, pluckers and doffer means in a common, but alternately opposite direction, whereby each bale is moved back and forth over at least one bridge.

8. A bale opening and blending apparatus comprising a frame, a plurality of conveyors connected to said frame in spaced relationship for supporting an array of fiber bales, a plurality of bridges, each of said bridges being disposed between adjacent conveyors and including a plurality of spaced members extending longitudinally of said frame, said bridge members defining a plurality of open slots, said bridges being connected to said frame so that their upper surfaces are below the upper surfaces of said conveyors, whereby portions of the bales over said bridges may breathe downwardly to effect a reduction in fiber density, a rotatable plucker below each bridge, each of said pluckers including a row of spaced plucker pins operatively disposed in said slots and adopted to extend into engagement with said bale portions of reduced fiber density, doffer means in operative conjunction with said pluckers, vertical adjusting means connecting said bridges, pluckers and doffer means to said frame, means below said doffer means for collecting tufts of fibers and means for actuating said conveyors, pluckers and doffer means in a common, but alternately opposite direction whereby each bale is moved over at least one bridge.

9. The apparatus as claimed in claim 8 wherein said vertical adjusting means comprises a separate adjustable mounting for each bridge, plucker and doffer means so that said bridges, plucker and doffer means can be vertically adjusted relative to one another.

10. The apparatus as claimed in claim 8 wherein said collecting means comprises a belt conveyor.

11. The apparatus as claimed in claim 8 wherein said collecting means comprises a pneumatic conveyor.

12. The apparatus as claimed in claim 11 wherein said pneumatic conveyor includes a doffer bowl coextensive with each doffer means, said bowls having bottom portions, and said pneumatic conveyor further including conduit means connecting the bottom portions of said bowls.

13. A bale opening and blending apparatus comprising a frame, a plurality of conveyors connected to said frame in spaced end-to-end relationship for supporting an array of fiber bales, means connected to said frame between said conveyors for removing tufts of fibers from the bottom surfaces of said bales, conveyor actuating means for actuating said conveyors and thereby moving the bales thereon over said fiber removing means, means mounted on said frame for rigidly confining said bales, said confining means including a traveling bale cage, said cage having an end wall and an opposite, removable gate, and means for actuating said bale cage in the direction of movement of said conveyors.

14. The apparatus as claimed in claim 13 wherein said cage includes opposed side walls, one of said side walls being adjustable toward and away from the other.

15. The apparatus as claimed in claim 13 wherein said bale confining means includes a bale hold-down platen carried by said cage, and means for moving said platen into engagement with the tops of said bales.

16. The apparatus as claimed in claim 15 wherein said platen moving means includes variable pressure means for maintaining substantially constant pressure engagement between the bales and said fiber-removing means.

17. The apparatus as claimed in claim 15 wherein said platen is formed by a plurality of members, each engageable with a selected number of bales.

18. The apparatus as claimed in claim 15 wherein said platen includes a center portion and hingedly connected end portions.

19. A bale opening and blending apparatus comprising a frame, a plurality of conveyor belts connected to said frame in spaced end-to-end relationship for supporting a plurality of fiber bales, a bridge connected to said frame between the ends of each pair of adjacent conveyors and below the upper surfaces of said conveyors, each of said bridges including a plurality of slots extending longitudinally of said frame, a rotatable plucker connected to said frame below each bridge, each of said pluckers including a row of spaced plucker pins operatively disposed in said slots, means for adjusting the relative positions of said pluckers and said bridges so that said pins extend a selected distance above said bridges, a doffer connected to said frame adjacent each of said pluckers, means connected to said frame below said doffers for collecting tufts of fibers, a traveling bale cage mounted on said frame for movement in the direction of said conveyors, a bale hold-down platen carried within said cage whereby said cage and platen cooperate to rigidly confine said bales, and means for actuating said pluckers, doffers, conveyors, and bale cage.

20. The apparatus as claimed in claim 19 wherein said collecting means comprises a pneumatic conveyor.

21. The apparatus as claimed in claim 19 including means for actuating said platen against said bales to maintain substantially constant pressure engagement between the bales and said pluckers.

22. The apparatus as claimed in claim 21 wherein said pluckers, doffers, and bridges each are adjustable up and down.

23. In a bale opening and blending apparatus including means for supporting bales of fibers for reciprocal movement through a substantially horizontal path of travel, and plucker means longitudinally spaced along said path of travel for plucking small tufts of fibers from the surfaces of the bales as they are reciprocated on said supporting means, the improvement comprising a traveling bale cage, said cage including means for confining an array of bales on said supporting means, means mounting said cage for reciprocal movement along said path of travel, and means connected to said cage for causing reciprocal movement.

24. A method of opening bales of fibers comprising the steps of arranging the bales in a row with a partial bale at one end of the row and a full bale at the other end, supporting and reciprocally moving the row of bales in a substantially horizontal path of travel, reducing the fiber density in the bottom surface portions of the bales by passing the bales back and forth over bridges in spaced relationship along and below said path of travel to form spaces down into which portions of the bales over the bridges can move, simultaneously removing tufts of fibers from the bale portions of reduced fiber density over said bridges until the partial bale is consumed, indexing the remaining bales to form a bale space at said other end of said row, and placing a full bale in said bale space.

References Cited by the Examiner

UNITED STATES PATENTS

| | | | |
|---|---|---|---|
| 551,677 | 12/95 | Jaeger | 19—81 |
| 2,221,262 | 11/40 | Mims et al. | |
| 2,445,912 | 7/48 | Frost | 19—80 |
| 2,938,239 | 5/60 | Leineweber et al. | 19—80 |
| 3,110,062 | 11/63 | Wildbolz et al. | 19—80 |
| 3,170,196 | 2/65 | Denis | 19—80 |

FOREIGN PATENTS

| | | |
|---|---|---|
| 364,364 | 1/32 | Great Britain. |
| 544,405 | 6/56 | Italy. |
| 121,365 | 4/58 | Russia. |

DONALD W. PARKER, *Primary Examiner.*